Patented July 11, 1944

2,353,228

UNITED STATES PATENT OFFICE 2,353,228

POLYSTYRENE MOLDING COMPOSITION

Frederick W. Ducca, Butler, N. J., assignor to Bakelite Corporation, New York, N. Y., a corporation of New Jersey No Drawing. Application August 1, 1941, Serial No. 405,078

7 Claims. (Cl. 260—36)

The invention relates to resinous materials composed essentially of polystyrene, and is particularly concerned with improved polystyrene molding compositions.

Synthetic polystyrene resins are well known in the art, as are their valuable properties for many commercial uses. Polystyrene can be molded, and has been formed in this manner into objects of various shapes and sizes. The flow characteristics of this resin are also suitable for injection molding, and articles so formed have shown exceptionally good strength and other desirable properties. Certain difficulties have, however, previously been encountered in the molding of polystyrene, due to the tendency of the resin to stick to the mold surface, and this fault has been especially objectionable at times in injection molding, where a free and ready release of the molded article is essential to efficient operation.

It is an object of this invention to provide polystyrene resin compositions of improved molding characteristics, and further to provide polystyrene of release properties excellently adapting it to fabrication by injection molding.

I have found that by incorporating small amounts of certain synthetic wax-like substances into polystyrene a lubricating action is imparted thereto, which substantially eliminates any tendency of the resin to adhere or stick to a mold. The lubricating substances employed are ones comparatively new commercially, some of which are known by the trade-name "Carbowax" products. They consist of highly polymerized chain-like hydrocarbon compounds which may be termed polyalkylene oxides, or since the polymer molecule appears to have hydroxyl groups at both ends of a long chain, they have also been referred to as polyalkylene glycols. In other modifications they may consist of mixtures of different polyalkylene glycols or monoethers of polyalkylene glycols. The compounds may be formed by the reaction of an alkylene oxide with an alkylene glycol or an alkylene glycol monoether, in the presence of an alkaline catalyst, and with the degree of polymerization controlled to produce the molecular size desired. Polymers varying in character from viscous liquids to pasty or solid materials are available, and the products as a class exhibit water solubility. For the purpose of this disclosure the term "polyalkylene oxides" is intended to include broadly any of the polymer modifications indicated.

In a preferred embodiment of the invention the lubricant additive is a polyalkylene oxide having an average molecular weight in excess of 400; and a polyethylene oxide having an average molecular weight in the neighborhood of 1500, and another having an average molecular weight nearer 4000, have given especially good lubricating action when incorporated with polystyrene.

A complete and uniform distribution of the lubricant throughout the resin mass is necessary, and can be accomplished by mechanical mixing of the polyalkylene oxide with the polystyrene, through a rolling, kneading or extrusion operation; or addition may be made to the monomeric styrene and the lubricant directly incorporated in the polymerized product during the usual polymerizing reaction. By either method of compounding only very small amounts of polyalkylene oxide are required to impart readily apparent improvement in release properties of the resin, and quantities not substantially more than 1%, or varying from about 0.1% to 0.7% by weight of the resin are usually sufficient. An incorporation of about 0.2% of polyethylene oxide in polystyrene has produced an excellent injection molding composition.

The following examples are representative of specific molding compositions contemplated by the invention:

Example 1

| | Grams |
|---|---|
| Polystyrene (polymerized as in Example 3) | 9,000 |
| Black dye | 21 |
| Polyethylene oxide (average molecular weight 1500) | 18 |

The lubricant was uniformly dispersed and mixed with the polystyrene by milling on heated rolls for a five minute period. A black resin composition was produced which on molding released readily from the mold and had otherwise excellent molding characteristics.

Example 2

| | Grams |
|---|---|
| Polystyrene (polymerized as in Example 3) | 9,000 |
| Titanium dioxide pigment | 45 |
| Red dye | 81 |
| Polyethylene oxide (average molecular weight about 1500) | 18 |

Compounded as in the above example this mix produced a red composition, also with excellent molding characteristics.

Example 3

| | Lbs. |
|---|---|
| Styrene (monomeric) | 2,000 |
| Polyethylene oxide (average molecular weight about 1500) | 4 |

After adding the lubricant to the monomeric styrene, the mix was polymerized by heating for a period of 15 hours at 100° C. to 114° C. The batch was then heated in an oven at 80° C. for one day and then at 140° C. for 5 days. The resulting polystyrene resin was converted to molding material by rolling and grinding operations, and again proved to have properties well adapted for injection or compression molding.

*Example 4*

| | Grams |
|---|---|
| Styrene (monomeric) | 5,500 |
| Polyethylene oxide (average molecular weight about 4000) | 11 |

The lubricant was added to the monomeric styrene, and the mix was then polymerized in an autoclave for 8 hours at 105° C. to 110° C., and 3¾ hours at 110° C. to 115° C. The mix was then removed, and heated in an oven, first for 24 hours at 100° C., and finally for 120 hours at 145° C. The material was rolled and ground into a molding powder, and, as in the other examples, proved to have excellent molding characteristics.

In all of the tests made with the polyalkylene oxide lubricated compositions, no deleterious effect is evidenced by the presence of the lubricant, in properties such as light stability, water adsorption, and other characteristics important to polystyrene resins. The lubricants are substantially colorless, and will not, therefore, discolor the resin, or interfere with standard molding composition colors. In addition to an improved release action, the lubricant also promotes in injection molding a more ready and complete filling of the mold, with much less tendency to form drag marks on the molded pieces, and the surface of molded articles made from these new compositions have a higher gloss than can be obtained from unlubricated polystyrene resin.

It will be understood that the above examples are merely illustrative of many molding compositions which may be made within the broader scope of the invention. As a resin base the tough and strong, high molecular weight products formed by the usual styrene polymerization reactions are suitable in the invention, and in many forms of expolymerized styrene, having, in general, properties adapted for molding, the new lubricating materials add valuable mold release properties. Pigments, and coloring materials, fillers, plasticizers, and other modifying agents, commonly employed in polystyrene compositions, can be incorporated along with the lubricant, and no limitations in this respect are intended.

I claim:

1. A resinous molding composition essentially comprising polystyrene containing a lubricant consisting of polyalkylene oxide of an average molecular weight greater than about 400, the said polyalkylene oxide being present in the small amount sufficient to cause the composition to release easily from a mold but not deleteriously affect the molding characteristics of the composition.

2. A resinous molding composition essentially comprising polystyrene containing a lubricant consisting of polyalkylene oxide of an average molecular weight greater than about 400, in an amount not substantially greater than 1.0% by weight of the rsin.

3. A resinous molding composition essentially comprising polystyrene containing a lubricant consisting of polyethylene oxide of an average molecular weight greater than about 400, in an amount not substantially greater than 1.0% by weight of the resin.

4. A resinous molding composition essentially comprising polystyrene containing a lubricant consisting of polyethylene oxide of an average molecular weight of about 1500, in an amount of about 0.1% to 0.7% by weight of the resin.

5. A resinous molding composition essentially comprising polystyrene containing a lubricant consisting of polyethylene oxide of an average molecular weight of about 4000, in an amount of about 0.1% to 0.7% by weight of the resin.

6. A resinous molding composition essentially comprising polystyrene of a molecular weight exceeding 60,000, containing a lubricant consisting of polyethylene oxide of an average molecular weight of about 1500, in an amount of about 0.2% by weight of the resin.

7. A resinous molding composition essentially comprising polystyrene of a molecular weight exceeding 60,000, containing a lubricant consisting of polyethylene oxide of an average molecular weight of about 4000, in an amount of about 0.2% by weight of the resin.

FREDERICK W. DUCCA.